United States Patent
Burnett

(10) Patent No.: US 7,492,790 B2
(45) Date of Patent: Feb. 17, 2009

(54) REAL-TIME REASSEMBLY OF ATM DATA

(75) Inventor: Charles J. Burnett, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1145 days.

(21) Appl. No.: 10/282,838

(22) Filed: Oct. 29, 2002

(65) Prior Publication Data

US 2004/0081204 A1 Apr. 29, 2004

(51) Int. Cl.
*H04L 12/28* (2006.01)
*H04L 12/56* (2006.01)
*H04J 3/24* (2006.01)

(52) U.S. Cl. .................. 370/474; 370/395.1; 370/397; 370/399

(58) Field of Classification Search ............... 370/395.1, 370/397, 399, 474
See application file for complete search history.

(56) References Cited

U.S. PATENT DOCUMENTS

| | | | |
|---|---|---|---|
| 5,602,853 A | 2/1997 | Ben-Michael et al. | |
| 6,097,734 A | 8/2000 | Gotesman et al. | |
| 6,877,076 B1 * | 4/2005 | Cho et al. | 711/157 |
| 7,107,509 B2 * | 9/2006 | Bickerstaff et al. | 714/780 |
| 7,110,363 B1 * | 9/2006 | Lawrence et al. | 370/236.1 |
| 7,129,744 B2 * | 10/2006 | Madurawe | 326/38 |
| 2002/0024970 A1 * | 2/2002 | Amaral et al. | 370/468 |

OTHER PUBLICATIONS

K. Siu and R. Jain, "A Brief Overview of ATM: Protocol Layers, LAN Emulation, and Traffic Management," Computer Communications Review (ACM SIGCOMM), vol. 25, No. 2, Apr. 1995, pp. 6-28, http://www.cis.ohio-state.edu/~jain/papers/atm_tut.htm.
IDT77252 and IDT77V252 ABR SAR User Manual (2001). Integrated Device Technogy, Inc.

* cited by examiner

*Primary Examiner*—Ronald Abelson

(57) ABSTRACT

The real-time reassembly of data received over an ATM network is enabled by a system including two digital memories, an indicator for indicating one of the two memories as a process memory and another one of the two memories as a storage memory, a buffer memory, a processor which processes the digital contents of a cell stored in the process memory and stores the digital contents of a subsequent cell in the storage memory. In operation of the system, the processing of the contents of the process memory is completed prior to completion of the receiving and storing of the contents of the subsequent cell in the storage memory.

9 Claims, 7 Drawing Sheets

REAL-TIME REASSEMBLY OF ATM DATA

BACKGROUND OF THE INVENTION

This invention relates generally to data communications, and, more particularly to a method and system for real-time reassembly of Asynchronous Transfer Mode (ATM) data.

In general terms, a computer network is a collection of end systems (also known as nodes) interconnected through one or more communication links. Generally, the end systems both send data (messages) to other end systems on the network and receive data sent by other end systems on the network.

Among available digital switching technologies, Asynchronous transfer mode (ATM) provides a promise of greater integration of services and increased flexible utilization of the network. Asynchronous transfer mode (ATM) configured networks allow high-speed data, voice and video communications to be conducted between endpoint computer systems. ATM networks, which are based on the transmission of fixed-length data packets, have proven to be extremely useful because they combine the benefits of both a switched network (i.e., constant transmission delay, guaranteed capacity) and a packet switched network (i.e., flexibility and efficiency for intermittent traffic).

In applications utilizing ATM, messages at a source are first broken up into these fixed length packets (ATM cells), transmitted, and then reassembled at a destination. ATM cells are 53 bytes long. They consist of a 5-byte header (containing an identifier of data flow which implicitly identifies the source address and the destination address) and a 48-byte information field. The header of an ATM cell contains all the information the network needs to relay the cell from one node to the next over a pre-established route. User data is contained in the remaining 48 bytes.

ATM uses a concept of virtual networking (or channels) to pass traffic between two locations, establishing virtual connections between a pair of ATM end-systems which are needed to connect a source with a destination. These connections are termed "virtual" to distinguish them from dedicated circuits. For any message, ATM cells always traverse the same path from source to destination. However, ATM does not have to reserve the path for one user exclusively. Any time a given user is not occupying a link, another user is free to use it.

ATM connections exist only as sets of routing tables held in each network node, switch, or other intermediate system, based on the virtual circuit identifier (VCI) and virtual path identifier (VPI) contained in the cell header. When a virtual path is established, each node (or switch) is provided with a set of lookup tables that identify an incoming cell by header address, route it through the node to the proper output port, and overwrite the incoming VCI/VPI with a new one that the next node along the route will recognize as an entry in its routing table.

The cell is thus passed from switch to switch over a prescribed route, but the route is "virtual" since the facility carrying the cell is dedicated to it only while the cell traverses it. Two cells that are ultimately headed for different destinations may be carried, one after the other, over the same physical wire for a common portion of their journey.

Typically, an ATM Network Interface Card (NIC) and accompanying software are provided within the sending (or receiving) endpoint computer systems to transmit (or receive) the cells of a message over a virtual circuit. On the receiving end of the ATM network is another endpoint computer. This endpoint computer also includes a NIC that receives the incoming cells in the same order as they were transmitted. As the cells are received, it is the task of NIC and/or processor to reassemble the cells into the original message.

Conventional NICs can be described according to the reassembly method utilized. In one reassembly method, the NIC provides receives cells, places the received cells in a FIFO buffer, processes the cell information, and provides the processed cell information to the system memory. The NIC manages reassembly buffers in system memory, sending a received cell to the appropriate buffer based on its virtual circuit identifier and thereby reassembling the message. However, it is the responsibility of the user (and the device driver) to provide sufficient system bus bandwidth so that a substantially fixed rate of transfer (between the NIC and the system memory) is maintained. This type of reassembly is used, for example, in the IDT77252 product available from Integrated Device Technology Inc. of Santa Clara, Calif. Another reassembly method attempts to reduce the burden on the interconnecting devices and buses by providing enough memory on-board the NIC to store a complete message before transfer. Thus, with this type of NIC the entire message is reassembled in the NIC's local memory and then is transferred at one time from the NIC to the host memory.

In the reassembly techniques described in U.S. Pat. No. 6,097,734, reassembled cells are collected in groups of variable (programmable) size and sent to the host computer.

In the above described techniques, the reassembly does not occur in real-time. In order to monitor the performance of the network, an instrument utilizing real-time reassembly is desirable since such an instrument would introduce minimal delays in the transmission through the network. There is a need for methods and systems for reassembling, in real-time, the data received over an ATM network.

It is therefore an object of this invention to provide methods and systems for the real-time reassembly of data received over an ATM network.

It is a further object of this invention to provide systems for the real-time reassembling of messages from cells received over multiple ATM links.

SUMMARY OF THE INVENTION

The objects set forth above as well as further and other objects and advantages of the present invention are achieved by the embodiments of the invention described hereinbelow.

The present invention enables the real-time reassembly of data received over an ATM network. In the method of this invention, a cell received in digital form over the network interface is stored in one of two memories. For the initial cell, the memory in which the initial cell is stored is indicated as the processing memory. The other memory is indicated as the storage memory. The method then proceeds by executing the following steps:

a) the cell stored in the processing memory is processed as follows:
1) the VPI/VCI information is obtained for the cell (Hereinafter, a succession of cells having the same VPI/VCI is referred to as a stream.);
2) information is obtained that indicates whether or not the cell contains the last data in a message;
3) a pointer to a location in a buffer memory is obtained,
4) the data contained in the cell being processed is stored in the location pointed in the buffer memory (this location is selected so that the data is appended to previous data from the same message);
5) if the cell contains the last data in a message, the contents stored in the buffer memory for that message are transferred to a capture buffer memory;

b) while the cell is being processed, a subsequent cell is received and is being stored in the other one of the two memories that is indicated as the storage memory; the processing of the contents of the processing memory is completed prior to completion of the receiving and storing of the contents of the subsequent cell;

c) the storage memory and the processing memory are interchanged (that is, the memory that was indicated as the storage memory becomes the processing memory, and, viceversa);

d) steps (a) through (c) are repeated until all cells are processed.

A system of this invention, for implementing the above described method, includes two digital memories, means for indicating one of the two memories as a processing memory and another one of the two memories as a storage memory, a buffer memory, means for processing the digital contents of a cell stored in the processing memory, and means for storing digital contents of a subsequent cell in the storage memory. In one embodiment, the two digital memories, the means for indicating one of said two memories, the means for obtaining contents of a cell, the means for processing digital contents of a cell, and the means for storing digital contents of a subsequent cell are included in a programmable gate array.

A system of this invention capable of reassembling messages from cells received over multiple ATM links includes one or more pair of reassembly modules, each one of the reassembly modules including the elements of the above described reassembly system.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

The methods and systems of this invention enable the real-time reassembly of data received over an ATM network. In a real-time operation a received ATM cell is processed and reassembled into a message as the next ATM cell is received and placed in temporary storage.

Figure 1A:
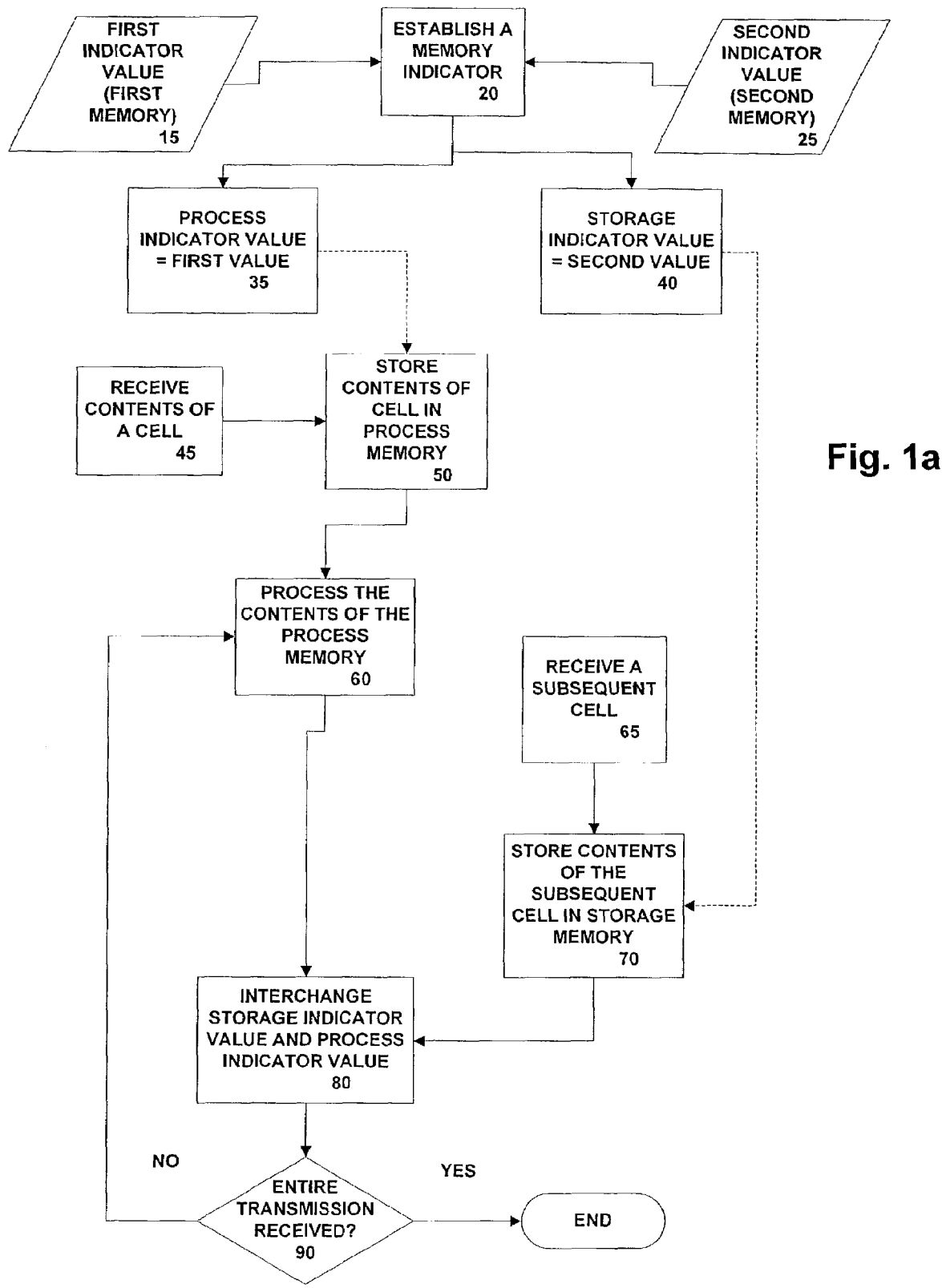
FIG. 1a describes a flowchart of an embodiment of the method of this invention.

FIG. 1a describes a flowchart of an embodiment of the method of this invention. Referring to FIG. 1a, to initialize the method, a memory indicator having two values is provided (step 20, FIG. 1a). A first value 15 corresponds to a first memory and a second value 25 corresponds to a second memory. A process indicator is provided and the value of the process indicator is initially set equal to the first value of the memory indicator (step 35, FIG. 1a). The contents of an initial cell are received (step 45, FIG. 1a) and stored in the memory corresponding to the process indicator value (step 50, FIG. 1a). Step 35 designates, as an initial condition, the first memory as the memory containing the cell to be processed. The contents of the memory corresponding to the process indicator value are then processed (step 60, FIG. 1a). The reassembly of a message results from the processing of the ATM cells in an entire message. A storage indicator is also provided and the value of the storage indicator is initially set equal to the second value of the memory indicator (step 40, FIG. 1a). (It should be noted that while the method refers to an indicator, various and different embodiments, such as flags and pointers, are possible. In one embodiment, a flag indicates that the process memory is full or empty, another flag indicates that the storage memory is empty or full and a state indicates whether the memory whose contents are being processed or stored is the first memory or the second memory. Other and similar embodiments are possible as would be noted by one skilled in the art.) A subsequent cell is received (step 65, FIG. 1a). The contents of the subsequent cell are stored in the memory corresponding to the storage indicator value (step 70, FIG. 1a). Step 40 designates, as an initial condition, the second memory as the memory containing the cell to be stored. The processing of the contents of the memory corresponding to the process indicator value is completed before the completion of the receiving and storing of the contents of the subsequent cell. The values of the storage indicator and the process indicator are then interchanged (step 80, FIG. 1a). By interchanging values of the storage indicator and the process indicator, the memory in which the contents of the subsequent cell are stored becomes the processing memory and the memory whose contents were processed in the preceding steps becomes available to store the next cell transmitted. If the entire transmission has not been received, steps 60 through 80 are repeated (step 90, FIG. 1a). It should be noted that what is deemed to be the receiving of the entire transmission can encompass several situations. An entire transmission session or a session where the available capture buffer storage capacity is entirely utilized constitutes an entire transmission. It should also be noted that the interchanging of indicator values is easily implemented in hardware.

Figure 1B:
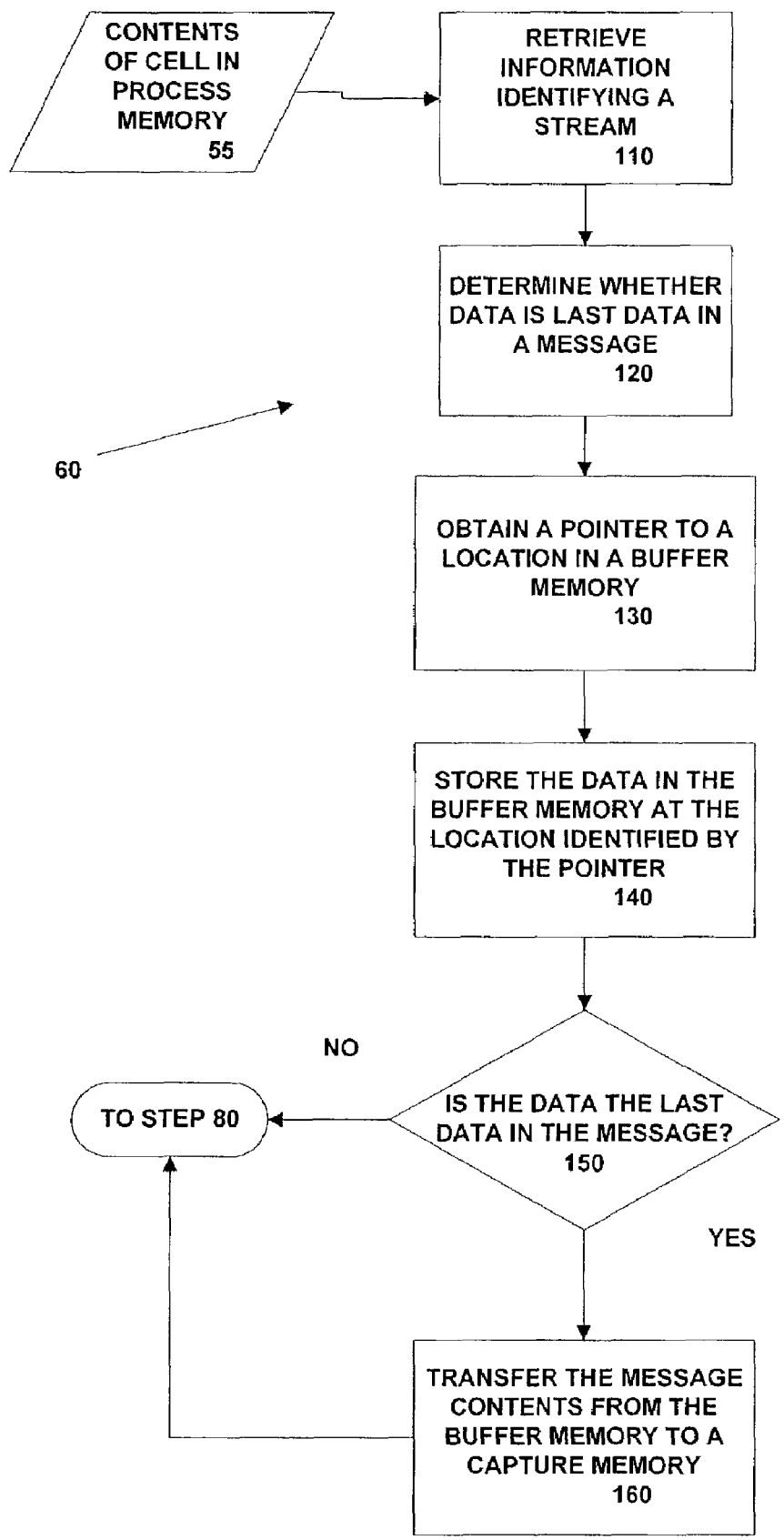
FIG. 1b describes a flowchart of a detailed description of the processing step in the embodiment shown in FIG. 1a of the method of this invention.
Figure 2B:
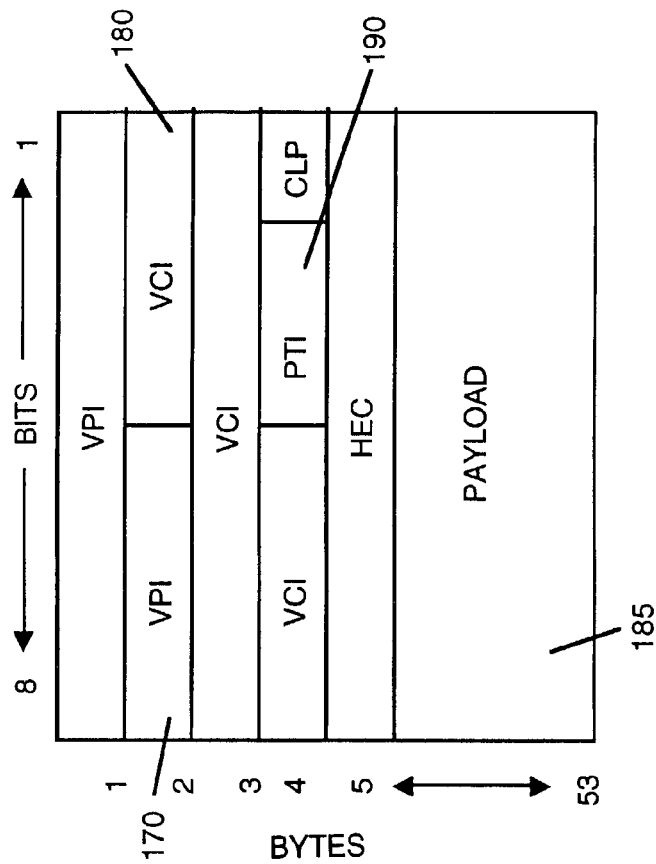
FIG. 2b is a block representation of another embodiment of an ATM cell format as given in prior art.
Figure 2A:
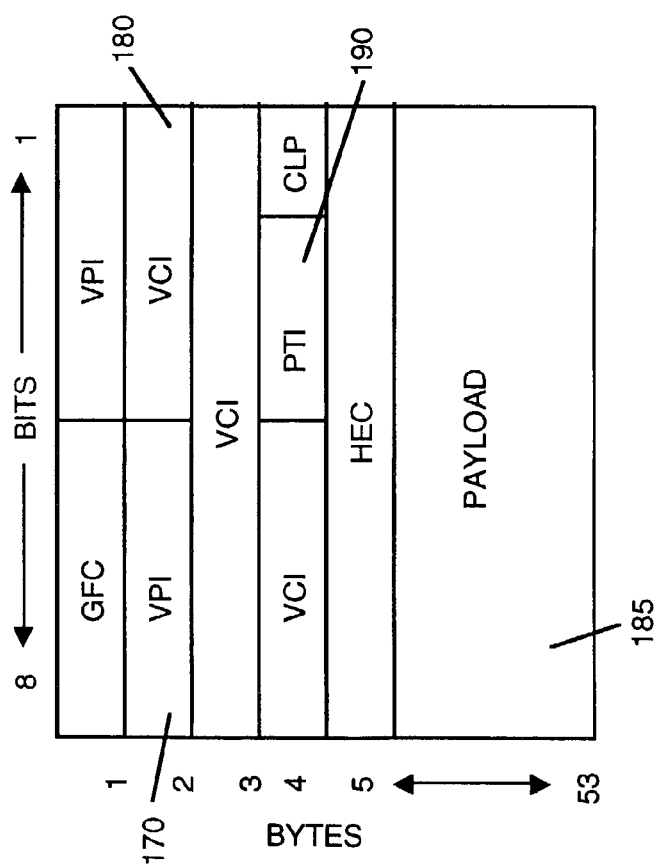
FIG. 2a is a block representation of one embodiment of an ATM cell format as given in prior art.

The method for reassembling the cells is given by the detailed description of the processing step 60, which are shown in FIG. 1b. Referring to FIG. 1b, the contents of the cell 55 in the memory corresponding to the process indicator value are the inputs to the processing steps. The process is best understood in reference to the format of an ATM cell, shown in FIGS. 2a, 2b. The format of an ATM cell has two commonly used forms, one form for the user-to-network interface (UNI), shown in FIG. 2a, and, another form for the network-to-node interface (NNI), shown in FIG. 2b. The most significant difference, in regards to this invention, between the UNI and the NNI formats is the size of the VPI field. In the UNI format, shown in FIG. 2a, the VPI field is an 8 bit field comprising bits 1 through 4 of the first byte and bits 8 through 5 of the second byte. In the NNI format, shown in FIG. 2b, the VPI field is a 12 bit field comprising all of the first byte and bits 8 through 5 of the second byte. In both formats, the VCI field is 16 bits long. The data in the VPI (virtual path identifier) field and the VCI (virtual circuit identifier) field are retrieved (FIG. 2a or FIG. 2b) and provide the information identifying a stream (step 110, FIG. 1b). A value of predetermined bit from the PTI (payload type indicator) field indicates the last data in the message. Reading that predetermined bit from the PTI field determines whether the cell data 210 (bytes 6 through 53 in FIG. 2a or 2b) is the last data in a message (step 120, FIG. 1b). Once the stream is identified by the VPI/VCI data, a pointer is obtained to a location in a buffer memory (step 130, FIG. 1b). The location in the buffer memory is one of a number of locations associated with a message in the stream identified by the VPI/VCI data. The cell data 185 is stored in the buffer memory at the location identified by the pointer (step 140, FIG. 1b). If the cell data 185 (bytes 6 through 53 in FIG. 2a or 2b) is not the last data in a message (step 150, FIG. 1b), the method proceeds to step 80 of FIG. 1a. If the cell data 210 is the last data in a message (step 150, FIG. 1b), the contents of the locations in the buffer memory associated with that message are transferred to a capture buffer memory. (After a previous cell in the stream corresponding to the VPI/VCI data is identified as containing the last data in a message, the subsequent cell in the same stream is identified as the start of a subsequent message. Data from each cell in the subsequent message is stored in the buffer memory at predetermined locations.) After the processing is completed, the method proceeds to step 80 of FIG. 1a.

Figure 3:
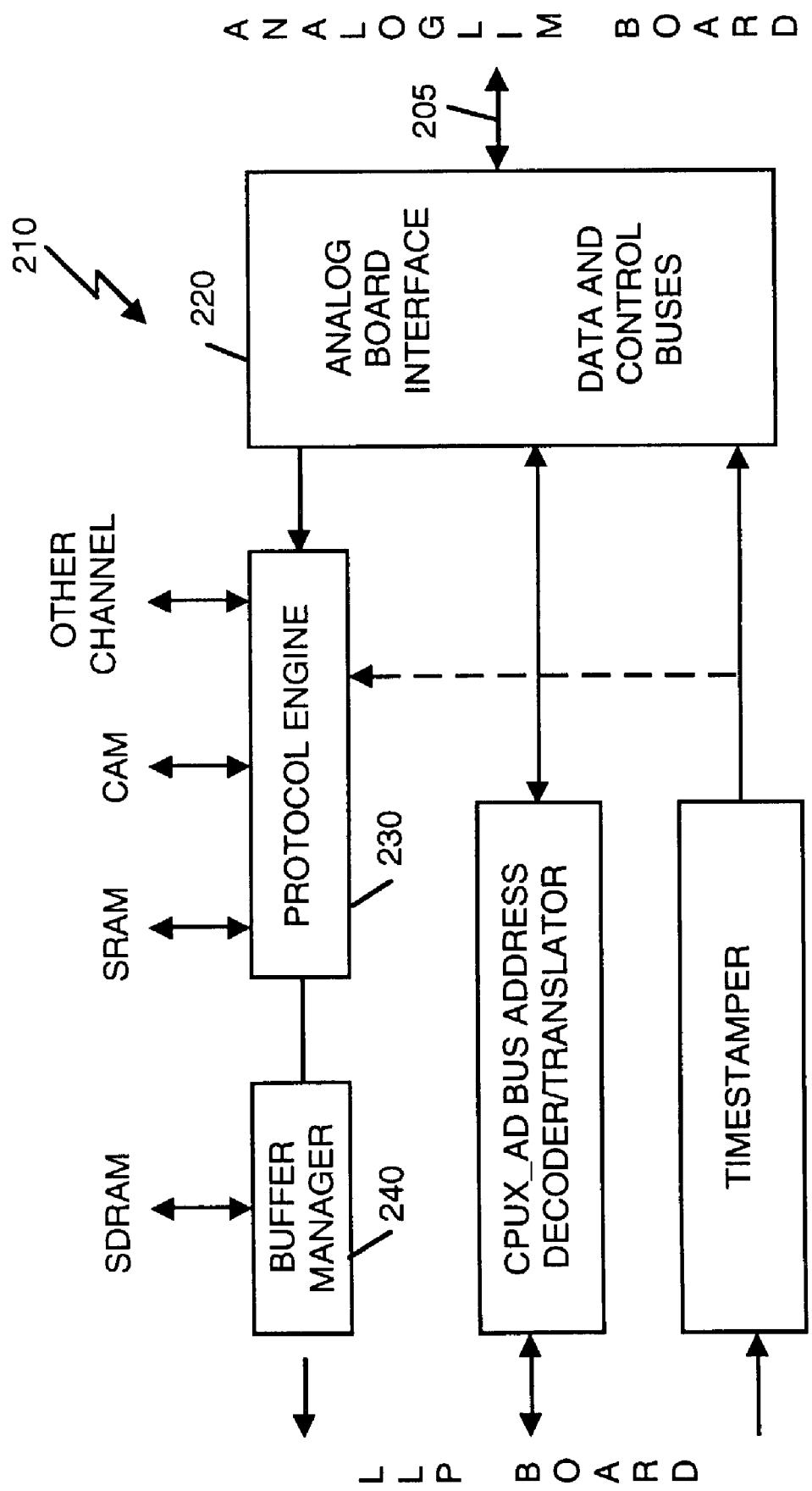
FIG. 3 is a block diagram of an embodiment of a component of a system of this invention.
Figure 4:
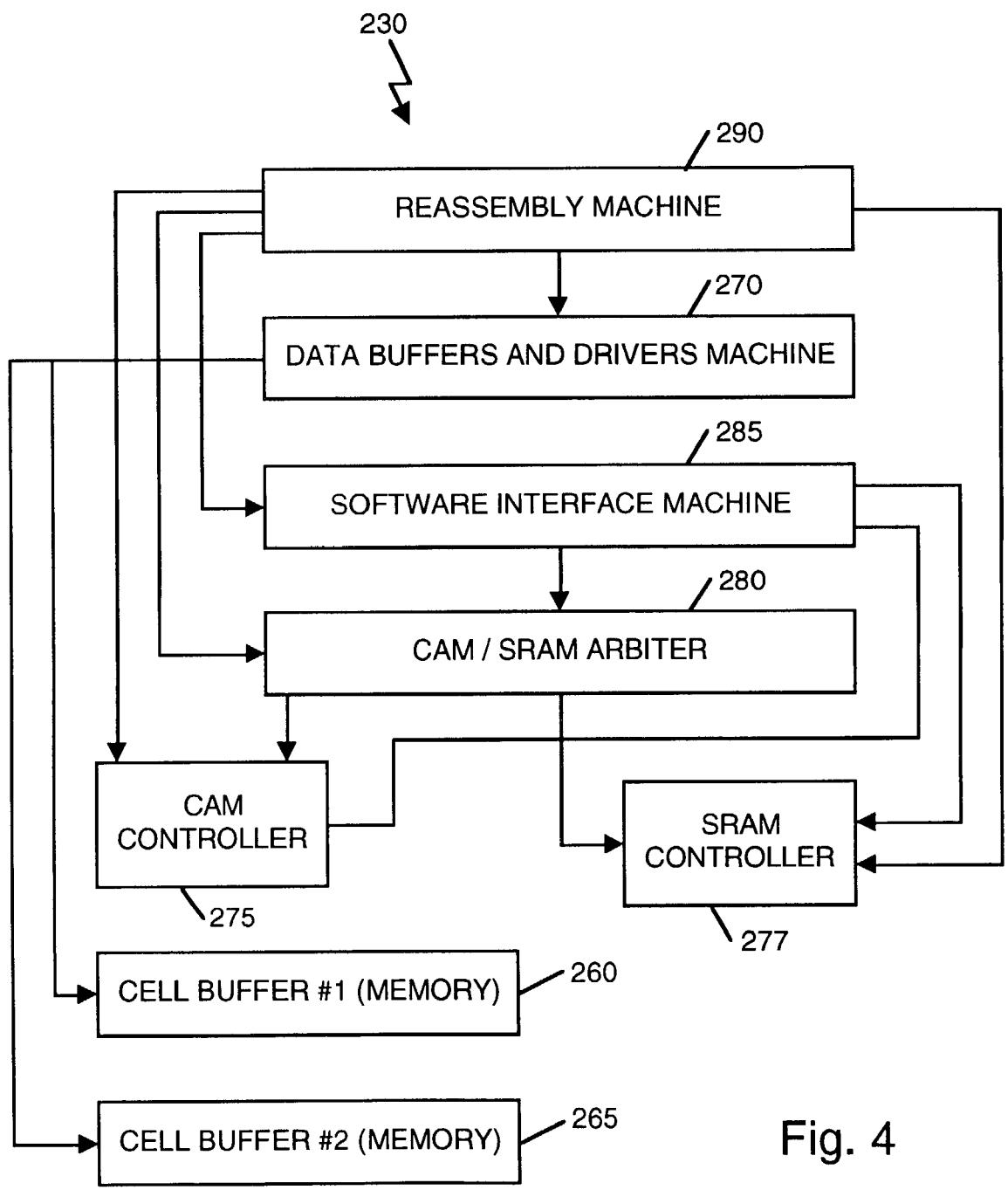
FIG. 4 is a block diagram of the protocol engine in the component given in FIG. 3.
Figure 5:
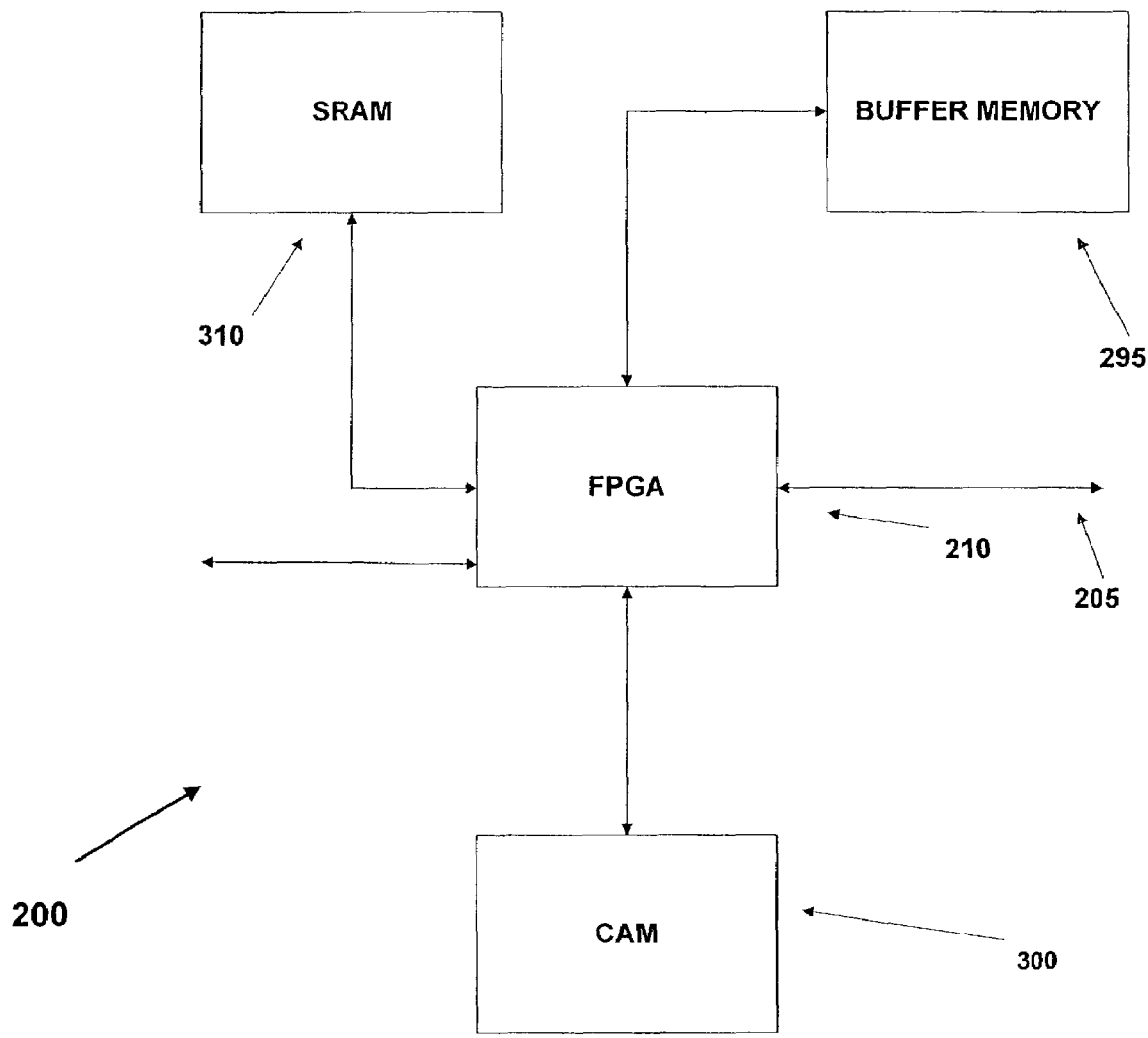
FIG. 5 is a block diagram of the embodiment of a system of this invention utilizing the component described in FIG. 3; and, FIG. 6 is a block diagram of another embodiment of the system of this invention.

Block diagrams of one embodiment of a system 200 of this invention are shown in FIGS. 3, 4 and 5. Referring to FIG. 5, ATM data enters the Field Programmable Gate Array (FPGA) 210. The structure of FPGA 210 is shown in FIG. 3. The Analog Board Interface 220 provides ATM cells in digital form to the protocol engine 230. The reassembly method of FIGS. 1a and 1b is implemented in the protocol engine 230. FIG. 4 provides a block diagram of the protocol engine 230 in the FPGA 210. As shown in FIG. 4, protocol engine 230 includes two digital memories 260, 265, a reassembly machine 290, a data buffers and drivers machine 270, a software interface machine 285, a CAM/SRAM arbiter 280, a CAM controller 275, and an SRAM controller 277. The data buffers and drivers machine 270 and the reassembly machine 290 provide means for indicating one of the two memories as a process memory and another one of the two memories as a storage memory. Exemplary instantiations of such means include flags or pointers and means for resetting those flags or pointers, both of which are known in the art. (In one embodiment, the reassembly machine 290 sets a flag indicating that the process memory is empty when the processing of a cell is complete and the contents transferred; the data buffers and drivers machine 270 sets another flag indicating that the storage memory is full when a subsequent has been received. A state indicates whether the memory whose contents are being processed or stored is the first memory or the second memory.) The reassembly machine 290 receives the contents of an ATM cell in digital form from the analog board interface 220 (FIG. 3) and, by means of the data buffers and drivers machine 270, stores the cell contents in the memory indicated as a process memory or the memory indicated as a storage memory. The reassembly machine 290 also implements digital logic hardware capable of retrieving information identifying a stream from the digital contents of a cell stored in the process memory and determining whether the contents of cell stored in the process memory include last data in a message. The information identifying a stream from the digital contents of a cell is retrieved, in one embodiment, by parsing the VPI and the VCI from the cell header of FIG. 2a or 2b. Whether the contents of cell include or do not include the last data in a message is determined, in one embodiment, by parsing one bit from the PTI field in fourth byte in the cell header of FIG. 2a or 2b. The reassembly machine 290 also, through the CAM/SRAM arbiter 280 and the CAM controller 275, is capable of obtaining a pointer from the CAM (Content Addressable Memory) 300 to a location in the buffer memory 295.

The CAM 300 provides a pointer to a location in a buffer memory 295 for a cell in stream (a succession of cells having the same VPI/VCI). The CAM 300 could be previously arranged or could be arranged during operation. In this latter mode, as a new stream is recognized, it is added to the CAM 300. The protocol engine 230 and the buffer manager 240 enable the storing the cell data (residing in bytes 6 through 53 in the cell format shown in FIG. 2a or 2b) in the buffer memory at the location identified by the pointer. If the contents of cell being processed include the last data in a message, the protocol engine 230 and the buffer manager 240 enable the transferring of the contents of the locations in the buffer memory 295 associated with that message (the one in which the cell data is the last data) to a capture buffer memory (not shown).

The reassembly machine 290 is capable of receiving the contents of a subsequent ATM cell in digital form while the preceding cell is being processed. The reassembly machine 290 and the data buffers and drivers machine 270 are also capable of storing the subsequent cell contents in the memory indicated as a storage memory. The reassembly machine 290 ensures that the processing of the contents of the process memory is completed before the obtaining and storing of the digital contents of the subsequent cell are completed. The data buffers and drivers machine 270 and the reassembly machine 290 enable the reversing of the indication of which one of the two memories is utilized as a process memory and which other one of the two memories is utilized as a storage memory.

The relationship between the method of FIGS. 1a and 1b and the embodiment of the system shown in FIGS. 3, 4, 5 goes beyond the method and enabler relationship. An algorithm corresponding to the method of FIGS. 1a and 1b is implemented in a Hardware Description Language, such as VHDL, and compiled into the FPGA 210.

The operation of system 200 can be best described in reference to FIGS. 3, 4 and 5. For specificity, consider that memory 260 (FIG. 4) is initially designated as the processing memory and memory 265 (FIG. 4) is initially designated as the storage memory. An ATM cell is received at 205 (FIG. 5) by FPGA 210. The Analog Board Interface converts the cell to digital form and the digital contents of the cell are provided to the protocol engine 230. Inside the protocol engine 230, the contents of the cell are stored in the processing memory, memory 260 at that instance. Processing by the reassembly engine 290 (FIG. 4) is initiated. At substantially the same time that processing of the contents of the processing memory is initiated, the subsequent cell is being received at 205, converted to digital form and stored in the storage memory, memory 265 at that instance. Processing of the contents of the processing memory occurs as follows. The VPI 170 and VCI 180 (FIG. 2a or 2b) information is obtained from bytes one through three of the ATM cell. The determination of whether the data is the last data in a message is obtained from the appropriate bit in the PTI field 190 (FIG. 2a or 2b) of the ATM cell. (If the cell is the first cell received, it is assumed to be the start of a message unless the bit in the PTI field 190 indicates the cell to be the last in a message. Once a cell has been indicated as including the last data, the next cell in that stream is considered to be the first cell in a message.) The VCI/VPI data is provided by the CAM controller 275 to the CAM 300. The CAM 300 returns a pointer to a location in the buffer memory 295, that location being one of the locations associated with a message in the stream indicated by the VPI/VCI. The data 185 in bytes 6 through 53 of the cell being processed is provided to the buffer memory 295 by the protocol engine 230 through the buffer manager 240 and stored in the buffer memory 295 at the location identified by the pointer. The receiving and storing in the storage memory of the subsequent cell occurs substantially simultaneously with the processing of the previously received cell. The processing of the contents of the processing memory is completed prior to completion of the receiving and storing of the contents of the subsequent cell in the storage memory. After both the processing of the contents of the processing memory and the storing of the contents of the subsequent cell in the storage memory are completed, the designation of one memory as a processing memory and another memory as a storage memory is interchanged (reversed). That is, the storage memory where the contents of the cell received subsequently to the processed cell are stored becomes the processing memory. The memory where the contents of the cell that was processed were stored becomes the storage memory and is available to receive the contents of the next cell received.

If the cell that was processed included the last data in the message, that determination of the indication of including the last data in a message (along with other data needed, such as the stream identifying VPI/VCI and, perhaps, the pointer) is provided by the protocol engine 230 to the buffer manager 240. The contents of the locations in the buffer memory 295 associated with that message in that stream are transferred to a capture buffer memory (not shown).

The SRAM 310 shown in FIG. 5 provides additional memory for housekeeping and statistics. That memory space can also be used for maintaining information regarding data cells or a message such as whether a cell data is the beginning or continuation of a message. The interaction between the SRAM 310 and the FPGA 210 occurs through the protocol engine 230. In the protocol engine 230, the CAM/SRAM arbiter 280 and the SRAM controller 277 implement the interaction between the SRAM 310 and the FPGA 210.

Figure 6:
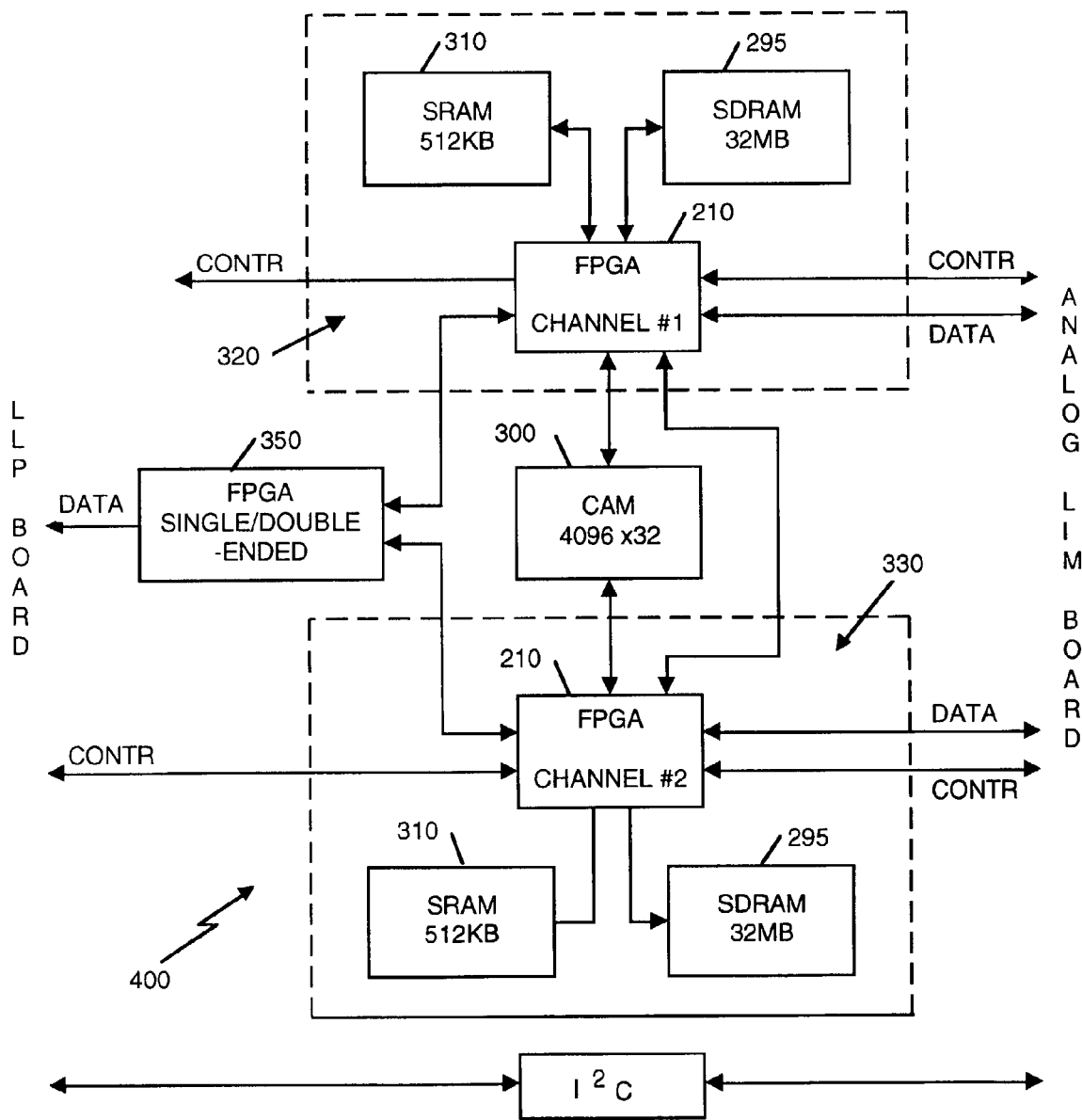

FIG. 6 presents a block diagram of a different embodiment of a system of this invention that is capable of reassembling messages from cells received over multiple ATM links. Shown in FIG. 6 is a system capable of reassembling ATM messages from the receive and send nodes of an ATM link. The system 400 includes one pair of reassembly modules 320, 330, each one reassembly module of the pair of reassembly modules including the same components as the system 200 of FIG. 5, an FPGA 210, a buffer memory 295 and another memory 310. The two modules 320 and 330 share one CAM 300. Each module 320 or 330 operates as described above. Modules 320 and 330 output provides message data to the capture buffer memory through one FPGA 350. FPGA 350 enables the interleaving, at the capture buffer memory, of a message transferred to the capture buffer memory from the buffer memory 295 of one of the reassembly modules 320 or 330 with another message transferred to the capture buffer memory from the buffer memory 295 of the other of the reassembly modules 320 or 330.

It should be noted that the field programmable gate arrays (FPGAs) can be easily converted into dedicated integrated circuits and the term FPGA, as used above and in the appended claims, also includes dedicated integrated circuits performing same or similar function.

While the above description was based on a hardware digital logic implementation of the methods of this invention, it should be noted that, for an appropriately fast processor, a software implementation including computer readable media with computer program products tangibly embodied therein can also be used.

Although the invention has been described with respect to various embodiments, it should be realized this invention is also capable of a wide variety of further and other embodiments within the spirit and scope of the appended claims.

What is claimed is:

1. A method for reassembling messages from cells received over an ATM network, the method comprising the steps of:
   a) establishing a memory indicator having two values, a first value corresponding to a first memory and a second value corresponding to a second memory;
   b) setting a value of a process indicator equal to the first value;
   c) setting a value of a storage indicator equal to the second value;
   d) receiving contents of a cell;
   e) storing the contents of the received cell in the memory corresponding to the process indicator value, the contents of the received cell constituting contents of the memory corresponding to the process indicator value;
   f) processing the contents of the memory corresponding to the process indicator value, the processing comprising the steps of:
      i) retrieving information identifying a stream;
      ii) determining whether the contents of the memory corresponding to the process indicator value include last data in a message;
      iii) obtaining a pointer identifying a location in a buffer memory, said location being one of a plurality of locations associated with a message in said stream; and,
      iv) storing data, said data included in the contents of the memory corresponding to the process indicator value, in the buffer memory at the location identified by the pointer;
   g) receiving a subsequent cell;
   h) storing contents of the subsequent cell in the memory corresponding to the storage indicator value while the contents of the memory corresponding to the process indicator value are being processed; wherein the processing of the contents of the memory corresponding to the process indicator value is completed prior to completion of the receiving and storing of the contents of the subsequent cell;
   i) interchange said values of the storage indicator and the process indicator; and,
   k) repeating steps f) through i) until all transmission has been received.

2. The method of claim 1 wherein the step of processing the contents of the memory corresponding to the process indicator value further comprises the step of:
   v) transferring the contents of the plurality of locations in the buffer memory associated with a message in said stream to a capture buffer memory, if the contents of the memory corresponding to the process indicator value include the last data in the message.

3. A system for reassembling messages from cells received over an ATM network, the system comprising:
   two digital memories;
   means for indicating one of said two memories as a process memory and another one of said two memories as a storage memory;
   a buffer memory;
   means for supplying a pointer identifying a location in the buffer memory;

means for obtaining contents of a cell in digital form;
means for processing digital contents of a cell stored in the process memory, said the processing means being capable of:
  i) retrieving information identifying a stream;
  ii) determining whether the digital contents of the cell stored in the process memory include last data in a message;
  iii) obtaining a pointer identifying a location in the buffer memory utilizing said means for supplying a pointer, said location being one of a plurality of locations associated with a message in said stream; and,
  iv) storing data, said data included in the digital contents of the cell stored in the process memory, in the buffer memory at the location identified by the pointer;
means for storing digital contents of a subsequent cell in the storage memory while the contents of the process memory are being processed, wherein the processing of the contents of the process memory is completed before obtaining and storing of the digital contents of the subsequent cell are completed; and,
means for reversing which one of said two memories is indicated as a process memory and which one of said two memories is indicated as a storage memory.

4. The system of claim 3 wherein said means for supplying a pointer comprise a content addressable memory.

5. The system of claim 3 wherein said the processing means being further capable of:
transferring the contents of the plurality of locations in the buffer memory associated with a message in said stream to a capture buffer memory, if the digital contents of the cell stored in the process memory include the last data in the message.

6. The system of claim 4 wherein said two digital memories, said means for indicating one of said two memories, said means for obtaining contents of a cell, said means for processing digital contents of a cell, and said means for storing digital contents of a subsequent cell are included in a programmable gate array.

7. A system for reassembling messages from cells received over multiple ATM links, the system comprising:
at least one pair of reassembly modules, each one reassembly module of said at least one pair of reassembly modules comprising:
  two digital memories;
  means for indicating one of said two memories as a process memory and another one of said two memories as a storage memory;
  a buffer memory;
  means for supplying a pointer to a location in the buffer memory;
  means for obtaining contents of a cell in digital form;
  means for processing digital contents of a cell stored in the process memory, said the processing means being capable of:
    i) retrieving information identifying a stream;
    ii) determining whether the digital contents of the cell stored in the process memory include last data in a message;
    iii) obtaining a pointer identifying a location in the buffer memory utilizing said means for supplying a pointer, said location being one of a plurality of locations associated with a message in said stream; and,
    iv) storing data, said data included in the digital contents of the cell stored in the process memory, in the buffer memory at the location identified by the pointer;
    v) transferring the contents of the plurality of locations in the buffer memory associated with a message in said stream to a capture buffer memory, if the digital contents of the cell stored in the process memory include the last data in the message;
  means for storing digital contents of a subsequent cell in the storage memory while the contents of the process memory are being processed; wherein the processing of the contents of the process memory is completed before obtaining and storing of the digital contents of the subsequent cell are completed;
  means for reversing which one of said two memories is indicated as a process memory and which one of said two memories is indicated as a storage memory; and
  at least one content addressable memory, said at least one content addressable memory being included in said means for supplying a pointer in each of the reassembly modules in said at least one pair of reassembly modules.

8. The system of claim 7 wherein, in each of the reassembly modules in said at least one pair of reassembly modules, said two digital memories, said means for indicating one of said two memories, said means for supplying a pointer, said means for obtaining contents of a cell, said means for processing digital contents of a cell, and said means for storing digital contents of a subsequent cell are included in a programmable gate array.

9. The system of claim 7 further comprising means for interleaving, at the capture buffer memory, a message constituted by the contents of the plurality of locations in the buffer memory transferred to the capture buffer memory from one of the reassembly modules in a pair from the at least one pair of reassembly modules with another message constituted by the contents of the plurality of locations in the buffer memory transferred to the capture buffer memory from another one of the reassembly modules in said pair from the at least one pair of reassembly modules.

* * * * *